United States Patent [19]

Griffith

[11] 4,430,133
[45] Feb. 7, 1984

[54] PROCESS FOR REPAIRING BODY PARTS ON VEHICLES OR THE LIKE

[75] Inventor: Frederick L. F. Griffith, 239 New Brunswick Ave., Perth Amboy, N.J. 08861

[73] Assignee: Frederick L. F. Griffith, New York, N.Y.

[21] Appl. No.: 321,078

[22] Filed: Nov. 13, 1981

[51] Int. Cl.³ ............................................. B32B 35/00
[52] U.S. Cl. .................................. 156/94; 29/402.09; 156/379; 264/36; 296/31 P; 296/198; 428/63; 428/131
[58] Field of Search ............... 29/402.09; 156/94, 379; 280/152 A, 153 A, 153 B; 296/31 P, 198; 264/36; 428/63, 131

[56] References Cited

U.S. PATENT DOCUMENTS 3,470,048 9/1969 Jones .................................... 156/94
4,147,576 4/1979 Beem et al. .......................... 156/94

OTHER PUBLICATIONS

Auto World 1977½ Motorsports Accessories Catalog, Fall/Winter 1977, p. 29.

Primary Examiner—Robert A. Dawson
Attorney, Agent, or Firm—Mandeville and Schweitzer

[57] ABSTRACT

A process for replacement of damaged parts of a vehicle or the like is disclosed. The process includes placing a manufactured overdimensioned part over the damaged part and adhering the overdimensioned part to the damaged part. The part may be fabricated from acrylic and may include an aperture. The acrylic part or any acrylic material may be illuminated by placing an illuminating means within the aperture.

6 Claims, 8 Drawing Figures

PROCESS FOR REPAIRING BODY PARTS ON VEHICLES OR THE LIKE

BACKGROUND AND SUMMARY OF THE INVENTION

It has been difficult in the past to economically repair FRP (Fiber Reinforced Plastic) or rigidized acrylic damaged body parts on trucks and the like. Previously, it was necessary to remove the damaged part and install a new part at considerable expense to the owner. The repair or replacement process was also rather difficult and time consuming. The process of the invention greatly facilitates the replacement of such damaged body parts in that it is possible to effect such replacement more easily, faster and much more economically than before.

The process of the invention involves the use of manufactured duplicate parts, the dimensions of which exceed the dimensions of the damaged body part. This "overdimensioned" duplicate part is manufactured so that the shape of one surface of the overdimensioned part generally conforms to the surface of the damaged body part. Thus, the duplicate part can be applied to the damaged part, thereby covering the damaged part. Advantageously, the pre-manufactured duplicate part will have an appearance which is identical to the original part (except for the difference in dimensions) and will have a structure which will be similar enough to that of the original to serve the same function. The duplicate part is to be applied to the damaged part in such a way that the duplicate adheres to the damaged part. In the event that an insufficient portion of the damaged part remains for effective adherence between the damaged and duplicate parts, the duplicate can be manufactured to include an additional surface which can be adhered to the surface of another body part of the truck.

According to another aspect of the invention, the overdimensioned body part may be fabricated from an acrylic resin and provided with an aperture. Applicant has discovered that if illuminating means such as a lightbulb, is placed within the aperture, substantially the entire acrylic part is illuminated in an impressive manner. This aspect of the invention may be used either in conjunction with or apart from the process of repair with the overdimensioned part.

For a more complete understanding of the above and other features and advantages of the invention, reference should be made to the following detailed description of the preferred embodiments thereof and to the accompanying drawings.

DETAILED DESCRIPTION OF THE INVENTION

Figure 1:
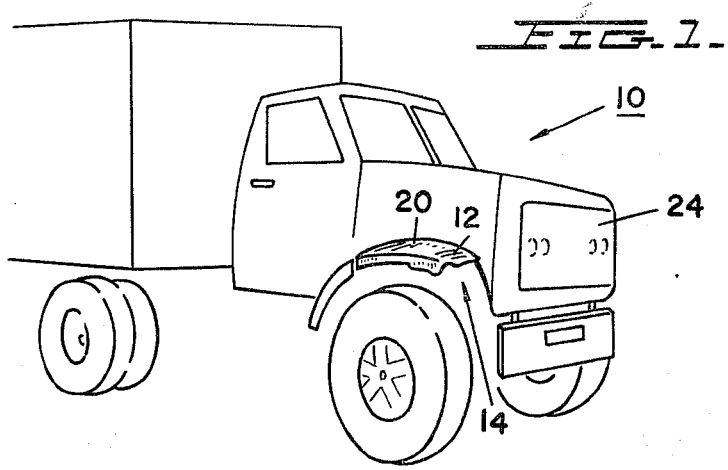
FIG. 1 is a partial perspective view of a truck with a damaged fender.
Figures 2, 5:
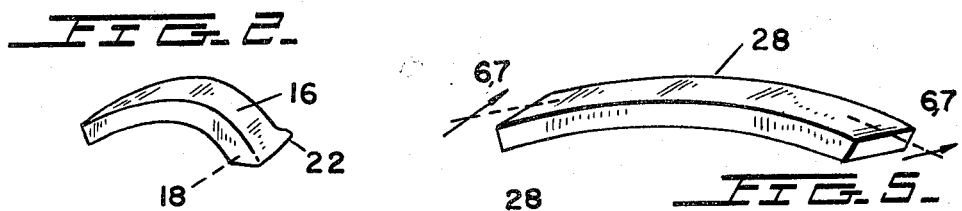
FIG. 2 is a perspective view of an overdimensioned duplicate fender for the truck of FIG. 1.
FIG. 5 is an illustration of a sheet of acrylic resin.

The conventional truck 10 has a damaged fender 12. The damage is particularly discernable at 14. A duplicate part 16 may be formed according to a conventional process, e.g., by molding. The dimensions of duplicate part 16 will be slightly larger than those of the original part so that it may be placed over the damaged part 14. The inner surface 18 of the overdimensioned part will be manufactured so as to generally conform to the outer surface 20 of the damaged part. The outer aspects of the overdimensioned part may resemble the original undamaged part as in FIG. 4.

The overdimensioned part may be fabricated from appropriate materials for the part which is being repaired, such as a metal or a plastic. After the overdimensioned part has been manufactured, it is placed over the old part. Typically, means for adhering the new part to the old one, such as glue, may be used.

Figure 4:
FIG. 4 is a perspective view of the truck of FIG. 1 having the overdimensioned duplicate fender in place over the damaged fender in accordance with the invention.

The process of repair according to the invention results in the installation of a replacement part which is barely distinguishable from the original part yet which is very easily, economically and quickly put into place. Advantageously, the overdimensioned part may include a flange or other structure which can adhere to a portion of the truck or other object being repaired other than the damaged part. This is particularly useful where the damaged part has insufficient structure remaining for satisfactory adherence of the overdimensioned part. In FIG. 4, for instance, the flange 22 adheres to the front 24 of the truck. The flange 22 may be adhered by, for instance, bolting or riveting.

Figures 3, 6:
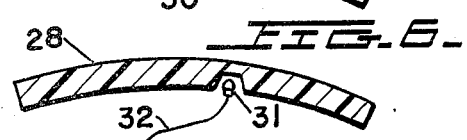
FIG. 3 is a perspective view of the duplicate fender of FIG. 2 taken from a somewhat different angle.
FIG. 6 is a cross section of the acrylic sheet of FIG. 5 having a partial aperture in accordance with another aspect of the invention.
Figure 7:
FIG. 7 is the acrylic sheet of FIG. 6 in which a light has been installed in the partial aperture.
Figure 8:
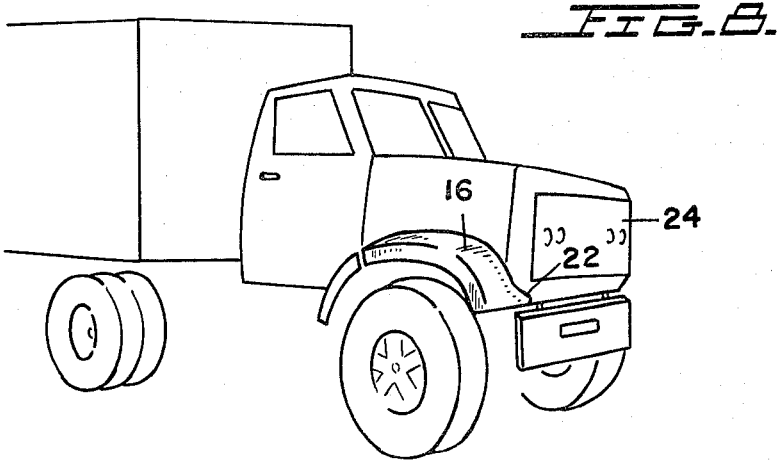
FIG. 8 is an illustration of the acrylic sheet according to FIG. 5 which sheet is illuminated in accordance with the invention.

Acrylic is an advantageous plastic material for the manufacture of the overdimensioned part used in the process of the invention. According to another aspect of the invention, acrylic materials, such as the overdimensioned duplicate body part, can be strikingly illuminated from within. Thus, an acrylic duplicate body part can serve as a turn signal or other vehicle light. FIG. 6 illustrates an acrylic sheet 28 having an aperture 30 formed therein. The aperture may, for example, be bored into or through the acrylic sheet. In FIG. 7, a lightbulb 31 having a wire 32 leading to a power source (not illustrated) is installed in the aperture and the entire sheet is illuminated as indicated in FIGS. 7 and 8. It will be apparent that this aspect of the invention is useful not only in the process for repairing body parts but will be advantageous wherever it is desirable to illuminate plastic objects.

It should be understood that the specific forms of the invention herein illustrated and described are intended to be representative only. Changes, including but not limited to those suggested in this specification, may be made in the illustrated embodiments without departing from the clear teachings of the disclosure. Accordingly, reference should be made to the following appended claims in determining the full scope of the invention.

I claim:

1. Process for installation of an-over-dimensioned replacement part of a damaged FRP or rigidized acrylic vehicle or the like, which comprises:

(a) placing a premanufactured over-dimensioned, duplicate part over the damaged part,
(b) the dimensions of said over-dimensioned duplicate part exceeding those of the damaged part, and
(c) adhering said duplicate part to said damaged part,
(d) the surface of said duplicate part generally conforming to the surface of said damaged part which is adhered thereto whereby said vehicle is repaired, the structure of said duplicate part being similar enough to that of the original to serve the same function.

2. Process for replacing a damaged FRP or rigidized acrylic vehicle part, which comprises:
(a) manufacturing an over-dimensioned duplicate part, the dimensions of which exceed the dimensions of the damaged body part,
(b) one surface of said over-dimensioned duplicate part generally conforming to the surface of the damaged part, and
(c) placing the over-dimensioned duplicate part over the old part and adhering said duplicate part thereto, whereby said vehicle is repaired, the structure of said duplicate part being similar enough to that of the original to serve the same function.

3. Process according to claim 1, wherein said overdimensioned part is fabricated from acrylic and contains an aperture for insertion of illuminating means.

4. Process according to claim 3, wherein an illuminating means is present in said aperture.

5. Process according to claim 1, wherein the damaged part is a fender and the duplicate part is a duplicate fender.

6. Process according to claim 1, wherein said duplicate part includes a flange or other structure which can be adhered to a portion of the object being repaired other than the damaged part.

* * * * *